Patented Apr. 29, 1941

2,239,780

UNITED STATES PATENT OFFICE 2,239,780

PROCESS FOR IMPROVING THE PROPERTIES OF THERMOPLASTIC, FILM-FORMING, ORGANIC SUBSTANCES

Hans Fikentscher and Heinrich Jacqué, Ludwigshafen-on-the-Rhine, Germany, assignors, by mesne assignments, to General Aniline & Film Corporation, New York, N. Y., a corporation of Delaware No Drawing. Application May 17, 1938, Serial No. 208,420. In Germany May 19, 1937

4 Claims. (Cl. 18—48)

The present invention relates to a process for improving the properties of thermoplastic, film-forming, organic substances.

It is known that thermoplastic organic film-forming substances can be converted by pressing, rolling or spraying while hot into shaped articles and that the mechanical properties of these shaped articles are very greatly dependent on the working temperature and, generally speaking, are better the higher the working temperature. In the improvement of the mechanical properties, however, there is a limit as regards the use of high temperatures because from certain temperatures upwards the substances stick to the apparatus or decompose for example.

We have now found that the properties of shaped articles especially those having in at least one direction a thin-walled structure, such as plates, foils, rods, tubes and also threads made from thermoplastic, organic, film-forming polymerization products by applying heat and pressure, for example by pressing, rolling, or extruding, can be considerably improved by heating them without using pressure to temperatures at which the said masses have only a slight shape stability but being below the decomposition point of that masses and higher than the temperature employed for shaping them and if desired subjecting them to a stretching at a lower temperature.

As thermoplastic, organic, film-forming polymerization products there may be mentioned those of vinyl chloride, styrene, acrylic nitrile, acrylic or methacrylic esters, or also polymerization products of mixtures of the said compounds with each other or with other compounds polymerizable under the same conditions and also their conversion products, in particular chlorination products. The process is of especially technical value in the case of polymerization products of vinyl chloride, i. e. of vinyl chloride alone or of mixtures of vinyl chloride and other polymerizable organic substances.

Small amounts of softening agents or sliding agents or pigments or dyestuffs or known stabilizing agents may also be added to the substances.

The mechanical properties of the said polymerization products vary very markedly upon heating. In particular the elastic and plastic extension of the substances is thus altered. The values for the elastic extension first rise upon heating but then fall considerably from a certain temperature upwards. The plastic extension is considerably less than the elastic extension at lower temperatures, while at very high temperatures, only plastic extension is present, i. e. by stretching the molecules slide past each other and when cooled they remain in the state caused by the stretching. At the temperatures at which plates, foils, rods, tubes or threads are to be aftertreated according to this invention, the polymerization products have a series of special properties. The elastic extension is practically no longer present. The tensile strength is only extremely small. It amounts to but a small fraction of the tensile strength at ordinary temperature, as for example one thousandth or less in the case of polymerized vinyl chloride. The masses therefore have but slight shape stability. This aftertreatment temperature lies for example with polymerized vinyl chloride at from 220 to 320° C., especially at from 250° to 280° C. depending on the stage of polymerization, the content of softening or plasticizing agents and the absence or presence of stabilizing agents. It may be readily ascertained for each polymerization product.

The heat treatment according to the new process need last but a very short time. The plates, foils, rods, tubes or threads may be led over hot surfaces, as for example stationary or rotary cylinders or through hot zones. Two or more hot surfaces or hot zones may also be arranged one behind another. If desired a small tension may be applied thereby in order to smooth the surfaces of the shaped articles employed. When treating threads it is preferable to use hot surfaces which have grooves. By using comparatively short hot surfaces, the danger of the polymerization products sticking thereto at the high temperatures and being deformed or even destroyed is avoided. The sticking of the products may also be prevented by suitable choice of the material of the hot surfaces or by roughening their surfaces or by dusting or brushing, for example with talc or wax, or by rapidly moving the hot surfaces against the shaped article to be treated. The hot zones may also be formed by red-hot radiating surfaces past which the polymerization products are led at a certain distance. Hot gases may also be allowed to flow against the polymerization products or the latter may be drawn through hot, indifferent liquids.

The thermal treatment may also be carried out with articles which are lined or surrounded with the said polymerization products. Thus for example a wire wound with a foil obtained by rolling, the molecules of which foil possess a certain degree of orientation in the rolling direction may be heated to the necessary temperature for a short time. In this treatment the covering lies tightly against the wire by reason of shrinkage. By pressing foils or bands which have already been treated according to this invention, thicker laminar products or even shaped articles may be obtained.

While the plates, foils, rods, tubes or threads prepared by pressing, rolling or extruding usually show a more or less marked contraction upon heating, a contraction or shrinking upon reheating, the articles treated according to this invention can practically be abolished at all. By the treatment the articles also undergo an improvement as regards the surface as also as regards the transparency and also frequently an increase in the elastic extension at ordinary temperature and in almost all cases an increase in their elastic extension at elevated temperature.

Thus for example a foil from highly polymerized vinyl chloride, which has been obtained by rolling at 185° C. and where a becoming rough or wrinkled or a decomposition of the product by the rolling process is just avoided, has an extension of only about 20 per cent at ordinary temperature. Even by a very long duration of rolling at 185° C. the extension can only be increased to about 40 per cent. The foil, however, commences to discolor by reason of decomposition. By a short treatment of a rolled foil of polymerized vinyl chloride obtained at 185° C. at about 280° C., the extension of the foil at ordinary temperature is, contrary to expectation, increased to 200 per cent or even more without a substantial discoloration taking place. The foil then has a more lustrous surface and clearer transparency. These special properties render the foil especially suitable for a series of uses, as for example for winding cables, for jacketings, as dielectric intermediate layers for condensers or as packing material.

In the following table are given the values of the mechanical properties of foils of polymerized vinyl chloride, unfilled and filled:

aftertreatment on a hot surface at the same temperatures as in the case of polyvinyl chloride, advantageously at about 250° C.

The plates, foils, rods, tubes or threads, after the treatment at temperatures at which they practically no longer have shape stability, may still be stretched by a subsequent stretching at low temperatures at which the elastic extension is still great. The stretching of the foils may be effected by leading over heated surfaces or through heated zones, but under the desired tension.

The stretching may be effected simultaneously or consecutively in the longitudinal and transverse directions.

It is preferable to select for the stretching treatment after the thermal treatment the temperature range in which the polymerization products have their maximum elastic extension, as for example from 100° to 140° C. in the case of polymerized vinyl chloride. By the said stretching treatment there is a partial very great increase in the tensile strength. Thus by stretching a polymerized vinyl chloride foil treated at 280° C. to 9 times the original length by drawing it over a cylinder heated to 120° C., there is obtained a foil which shows in the Röntgen picture a clear fibre diagram, which has an extremely high tensile strength of from 280 to 330 grams per 100 deniers and which may readily be split into fine fibres. Without the thermal treatment at 280° C., the rolled foils at 120° C. can only be stretched by about 70 per cent. The tensile strength has only been increased by about 20 per cent, namely only about 55 grams per 100 deniers.

The following Table 2 gives the values for the tensile strength, breaking extension and capacity of being split to fibres of polymerized vinyl chloride foils which have been stretched more or less strongly at different temperatures as compared with foils which have been subjected to a thermal treatment at 290° C. and then stretched in part in the same way.

In Table 2, A is a foil rolled at 185° C. without aftertreatment;

B is the same foil with aftertreatment at 290° C.;

C is a cast foil from a dioxane solution:

$a$ is the temperature of the stretching in degrees centigrade;

$b$ is the stretching, in per cent of the original length, which is the maximum obtainable;

Table 1

| No. | Filler | | Mechanical properties | | | |
|---|---|---|---|---|---|---|
| | Kind | Amount, percent | Measured in the rolling direction before the treatment | | Measured in the running direction of the foil after the treatment | |
| | | | Pulling force in grams per 100 deniers | Extension in percent | Pulling force in grams per 100 deniers | Extension in percent |
| 1 | None | | 50-60 | 10-40 | 38-50 | 200-300 |
| 2 | Carbon black | 1 | 41-44 | 14-20 | 39-50 | 125-170 |
| 3 | Aluminum powder | 3 | 42-43 | 7-18 | 38-46 | 150-185 |
| 4 | Cadmium red | 17 | 36-37 | 6-7 | 34-38 | 100-115 |
| 5 | Titanium white | 10 | 38-42 | 7-29 | 33-46 | 92-102 |

In the case of an interpolymerization product of 80 parts of vinyl chloride and 20 parts of styrene, which has been rolled into a foil at 153° C., the elastic extension may be increased to three times the amount of the original extension by an $c$ is the stretching, in per cent of the original length, actually carried out;

$d$ is the tensile strength in grams per 100 deniers after the stretching according to $c$;

$e$ is the breaking extension in per cent;

$f$ is the splitting capacity and
$g$ is the transparency.

Table 2

| | a | b | c | d | e | f | g |
|---|---|---|---|---|---|---|---|
| A | 20 | 20(40) | 0 | 45 | 10-20(40) | None | Turbid |
| | 120 | 70 | 70 | 55 | 4-20 | do | Do |
| | 170 | 40 | | | | do | Do |
| B | 20 | 200 | | | 200 | do | Paler |
| | 115 | 400 | 250 | 185 | 15 | do | Milky |
| | | | 400 | 220 | 8 | do | Do |
| | 119 | 880 | 150 | 130 | 45 | do | Pale |
| | | | 450 | 225 | 16 | Slight | Do |
| | | | 830 | 280-330 | 11-15 | Very good | Do |
| | | | 880 | 170 | 8 | do | Milky |
| | 130 | 650 | 350 | 220 | 18 | None | Pale |
| | | | 480 | 270 | 16 | Slight | Do |
| | | | 650 | 212 | 10 | Very good | Do |
| | 150 | 400 | 200 | 170 | 25 | None | Do |
| | | | 400 | 185 | 12 | | Do |
| | 170 | 300 | 130 | 105 | 60 | None | Do |
| | | | 260 | 129 | 60 | do | Do |
| C | 118 | 620 | 700 | 150 | 12 | Good | Do |
| | | | 820 | 220 | 11 | Very good | Do |

For the purpose of comparison, the properties of a foil of polymerized vinyl chloride cast from dioxane (C) are also given. The table clearly shows that the foil treated at 290° C. and stretched at 119° C. is superior in mechanical values even in part to the cast foil, while the foil not treated at high temperatures has comparatively small values in mechanical properties. It may also clearly be seen that the tensile strength and extension of the foils may be influenced to a great extent and foils having the desired properties can be obtained depending on the stretching temperature and on the degree of subsequent stretching.

Also with a foil of the aforementioned interpolymerization product of 80 parts of vinyl chloride and 20 parts of styrene, which has been treated at 215° C. by subsequent stretching at 96° C. to 150 per cent the tensile strength may be increased from 40 grams to 145 grams per 100 deniers.

The films or threads which have been stretched following the thermal treatment may also find manifold use as for example in the cable industry, as substitute for bast, for the preparation of yarns, ropes, horsehair, netting or fishnets and for coating, cushioning and decorating purposes.

The fibres obtained by splitting in the longitudinal direction strongly orientated foils may be spun into yarns and these woven into fabrics which by reason of their chemical resistance may find manifold use.

What we claim is:

1. A process for improving the properties of shaped articles substantially consisting of polyvinyl chloride which have been prepared by simultaneous action of heat and pressure which comprises heating the said shaped articles without using pressure to temperatures of between 220 and 320° C.

2. A process for improving the properties of shaped articles substantially consisting of polyvinyl chloride which have been prepared by simultaneous action of heat and pressure which comprises heating the said shaped article without using pressure to temperatures of between 250 and 280° C.

3. A process for improving the properties of shaped articles substantially consisting of polyvinyl chloride which have been prepared by simultaneous action of heat and pressure which comprises drawing the said shaped articles without using pressure over a surface heated to temperatures of between 220 and 320° C.

4. A process as defined in claim 1 which includes the additional step comprising stretching the articles of the heat treatment without pressure, at a lower temperature.

HANS FIKENTSCHER.
HEINRICH JACQUÉ.